(12) United States Patent
Lin et al.

(10) Patent No.: US 11,399,066 B2
(45) Date of Patent: Jul. 26, 2022

(54) RELIABILITY EVALUATION METHOD AND DEVICE OF MULTI-STATE DISTRIBUTED NETWORK SYSTEM, AND COMPUTER PROGRAM PRODUCT

(71) Applicant: Acer Incorporated, New Taipei (TW)

(72) Inventors: Yi-Kuei Lin, New Taipei (TW); Ding-Hsiang Huang, New Taipei (TW); Cheng-Fu Huang, New Taipei (TW)

(73) Assignee: ACER INCORPORATED, New Taipei (TW)

(*) Notice: Subject to any disclaimer, the term of this patent is extended or adjusted under 35 U.S.C. 154(b) by 0 days.

(21) Appl. No.: 17/321,657

(22) Filed: May 17, 2021

(65) Prior Publication Data

US 2022/0124155 A1 Apr. 21, 2022

(30) Foreign Application Priority Data

Oct. 20, 2020 (TW) .................................. 109136293

(51) Int. Cl.
*H04L 67/12* (2022.01)
*H04L 47/10* (2022.01)
(Continued)

(52) U.S. Cl.
CPC .............. *H04L 67/12* (2013.01); *G16Y 30/00* (2020.01); *G16Y 40/35* (2020.01); *H04L 47/15* (2013.01)

(58) Field of Classification Search
None
See application file for complete search history.

(56) References Cited

U.S. PATENT DOCUMENTS 8,531,977 B2 * 9/2013 Lin ........................ H04L 45/124
370/252
8,660,025 B2 * 2/2014 Lin ....................... H04L 41/0893
370/252

(Continued)

FOREIGN PATENT DOCUMENTS

EP 2 439 882 A1 4/2012

OTHER PUBLICATIONS

European Search Report dated Nov. 4, 2021, issued in application. EP 21175242.3.

(Continued)

*Primary Examiner* — Backhean Tiv
(74) *Attorney, Agent, or Firm* — McClure, Qualey & Rodack, LLP

(57) ABSTRACT

A reliability evaluation method for a multi-state distributed network system is provided. The network system includes a network topology of Internet of Things (IoT) devices, edge servers, cloud servers, transmission nodes and transmission arcs. The capacity of the transmission arc is regarded as a random multi-state. The data generated by the IoT devices are transmitted to the edge servers. After processing and compression by the edge servers, the data are transmitted to the cloud servers for calculation. System reliability is defined as the probability that a specific amount of data can be successfully transferred from the IoT devices to the cloud servers. Algorithms are used to calculate the transmission mechanism between the IoT devices, the edge servers, and the cloud servers, evaluate the quality and reliability of multi-state distributed network systems, and further serve as an indicator of system management. Sensitivity analysis is also used to improve quality.

20 Claims, 3 Drawing Sheets

(51) Int. Cl.
    *G16Y 30/00*           (2020.01)
    *G16Y 40/35*           (2020.01)

(56) References Cited

U.S. PATENT DOCUMENTS

| | | | | |
|---|---|---|---|---|
| 11,165,665 | B2* | 11/2021 | Kondo | H04L 43/10 |
| 11,256,242 | B2* | 2/2022 | Celia | H04B 17/23 |
| 2002/0101821 | A1* | 8/2002 | Feldmann | H04L 45/12 |
| | | | | 370/252 |
| 2010/0315959 | A1* | 12/2010 | Lin | H04L 45/124 |
| | | | | 370/250 |
| 2012/0008945 | A1* | 1/2012 | Singla | H04J 14/0204 |
| | | | | 398/45 |
| 2012/0079089 | A1* | 3/2012 | Lin | H04L 41/0893 |
| | | | | 709/223 |
| 2020/0162503 | A1* | 5/2020 | Shurtleff | H04L 41/0893 |
| 2021/0200540 | A1* | 7/2021 | Chofleming | G06F 9/3001 |
| 2021/0203615 | A1* | 7/2021 | Roy | H04L 67/12 |

OTHER PUBLICATIONS

Chin, T.L., et al.; "Queuing Model Based Edge Placement for Work Offloading in Mobile Cloud Networks;" Special Section on Green Communications on Wireless Networks; Mar. 2020; pp. 47295-47303.

Lin, Y.K., et al.; "Estimated and Exact System Reliabilities of A Maintainable Computer Network;" J Syst Sci Syst Eng Jun. 2011; pp. 229-248.

\* cited by examiner

RELIABILITY EVALUATION METHOD AND DEVICE OF MULTI-STATE DISTRIBUTED NETWORK SYSTEM, AND COMPUTER PROGRAM PRODUCT

CROSS REFERENCE TO RELATED APPLICATIONS

This application claims priority from Taiwan Patent Application No. 109136293, filed on Oct. 20, 2020, the disclosure of which is incorporated herein by reference in its entirety.

BACKGROUND

Technical Field

The present disclosure is generally related to a reliability evaluation method, device and computer program product. More specifically, aspects of the present disclosure are related to a reliability evaluation method and device of a multi-state distributed network system, and computer program product.

Description of the Related Art

With the development and application of cloud computing networks (CCN) in the field of information and communication gradually becoming mature, it is necessary to develop a method to evaluate the performance of CCN and ensure that good quality of service (QoS) can be maintained. In order to ensure the QoS of CCN, a cloud computing network must provide sufficient load capacity to meet the client's demand for data transmission. When data is transmitted through the CCN, it is best to be able to choose the path with the shortest transmission time or delay time to reduce the transmission time of the entire CCN. In addition, the CCN may cause a failed state due to factors such as transmission line failure, partial failure, and maintenance. Therefore, when estimating the performance of a CCN, the choice of transmission path, load capacity, transmission time, data transmission costs and maintenance costs are all factors that need to be considered.

However, the prior art seldom provides specific methods of how to evaluate the performance of CCNs. The prior arts focus on cloud computing and how edge computing performs data transmission. The prior art does not discuss how to evaluate the system reliability of the cloud and edge computing network under conditions of system component failure, and this is a lack in the prior art. Therefore, how to evaluate the CCN to obtain an accurate value of system reliability under the transmission condition of the CCN through multiple transmission paths is an urgent problem in this technical field.

SUMMARY

Various aspects of the present disclosure are aimed at calculating the probability that the entire CCN can operate normally under the background that the components in the system will fail. This is the "system reliability", which is used as the basis for analysis and management.

Based on the above purpose, a system reliability evaluation method, device and computer program product are provided in embodiments of the present disclosure, which is suitable for data transmission in cloud computing network systems. The cloud computing network system comprises Internet of Things (IoT) devices, edge servers, cloud servers, and transmission arcs, the system reliability evaluation method comprises the following steps.

A network topology of the cloud computing network system is defined, wherein the step of defining the network topology comprises defining configurations of the transmission arcs between the IoT devices and the edge servers, and defining configurations of the transmission arcs between the edge servers and the cloud servers.

A total transmission demand formed by the traffic transmitted by the IoT devices to the edge servers is allocated.

The configurations of the transmission arcs of first transmission paths between the IoT devices and the edge servers are calculated according to transmission and distribution traffic.

A data transfer coefficient for each edge server is set, wherein the data transfer coefficient represents the data compression performed when each edge server receives data transmitted from the IoT devices.

Traffic to second transmission paths between the edge servers and the cloud servers are allocated according to the data transfer coefficients and the total transmission demand of each edge server.

Configurations of the transmission arcs of the second transmission paths is calculated according to the transmission and distribution traffic, wherein each of the first transmission paths and each of the second transmission paths comprise a transmission node.

A system reliability of the cloud computing network system is calculated according to the configurations of the transmission arcs of the first transmission paths satisfying the transmission and distribution traffic and the second transmission paths satisfying the transmission and distribution traffic, wherein the system reliability represents the probability that the total transmission demand is delivered to the cloud servers.

According to an embodiment of the present disclosure, the step of defining the configurations of the transmission arcs comprises: defining a traffic state of each transmission arc, wherein the traffic state of each transmission arc has a maximum traffic value.

According to an embodiment of the present disclosure, the step of defining the traffic state of each transmission arc comprises defining a traffic probability value corresponding to the traffic state of each transmission arc.

According to an embodiment of the present disclosure, each first transmission probability value is calculated according to each traffic probability value of each transmission arc and the traffic allocated to each IoT device, and each second transmission probability value is calculated according to each traffic probability value of each transmission arc, the data transfer coefficients, and the relay traffic received by each edge server.

According to an embodiment of the present disclosure, the transmission arc is further comprised between the transmissions nodes.

According to an embodiment of the present disclosure, among the first transmission paths and the second transmission paths, all transmission arcs are unidirectional transmission.

According to an embodiment of the present disclosure, the data transfer coefficient is between 0 and 1.

According to an embodiment of the present disclosure, when the first transmission probability values corresponding to all the first transmission paths are 0, the subsequent system reliability evaluation method is stopped.

According to an embodiment of the present disclosure, the system reliability corresponding to the total transmission demand corresponds to the union of the configurations of the transmission arcs of the first transmission paths with the shortest path, and the second transmission paths with the shortest path.

According to an embodiment of the present disclosure, the method further comprises: the system reliability evaluation method is repeatedly executed under the same conditions of total transmission demand, wherein when the configurations of the IoT devices are different, different sensitivities of the IoT devices are generated.

A computer program product for use with a computer, the computer program product comprising a non-transitory computer usable medium having a computer readable program code embodied therein, the computer readable program code performing the steps of: defining a network topology of the cloud computing network system, wherein the step of defining the network topology comprises defining configurations of the transmission arcs between the IoT devices and the edge servers, and defining configurations of the transmission arcs between the edge servers and the cloud servers; allocating a total transmission demand formed by the traffic transmitted by the IoT devices to the edge servers; calculating the configurations of the transmission arcs of first transmission paths between the IoT devices and the edge servers according to transmission and distribution traffic of each of the edge servers, wherein the sum of the transmission and distribution traffic is the total transmission demand; setting a data transfer coefficient for each edge server, wherein the data transfer coefficient represents the data compression performed when each edge server receives data transmitted from the IoT devices; allocating traffic to second transmission paths between the edge servers and the cloud servers according to the data transfer coefficient and the transmission and distribution traffic, and calculating configurations of the transmission arcs of the second transmission paths, wherein each of the first transmission paths and each of the second transmission paths comprise a transmission node; and calculating system reliability of the cloud computing network system according to the configurations of the transmission arcs of the first transmission paths satisfying the transmission and distribution traffic and the second transmission paths satisfying the transmission and distribution traffic, wherein the system reliability represents the probability that the total transmission demand is delivered to the cloud servers.

A system reliability evaluation device is also provided according to an embodiment of the present disclosure. The device is suitable for data transmission of a cloud computing network system, wherein the cloud computing network system comprises Internet of Things (IoT) devices, edge servers, cloud servers, and transmission arcs, the system reliability evaluation device comprising: a processor, configured to execute the following tasks: defining a network topology of the cloud computing network system, wherein the step of defining the network topology comprises defining configurations of the transmission arcs between the IoT devices and the edge servers, and defining configurations of the transmission arcs between the edge servers and the cloud servers; allocating a total transmission demand formed by the traffic transmitted by the IoT devices to the edge servers; calculating the configurations of the transmission arcs of first transmission paths between the IoT devices and the edge servers according to transmission and distribution traffic of each of the edge servers, wherein the sum of the transmission and distribution traffic is the total transmission demand; setting a data transfer coefficient for each edge server, wherein the data transfer coefficient represents the data compression performed when each edge server receives data transmitted from the IoT devices; allocating traffic to second transmission paths between the edge servers and the cloud servers according to the data transfer coefficient and the transmission and distribution traffic, and calculating configurations of the transmission arcs of the second transmission paths, wherein each of the first transmission paths and each of the second transmission paths comprise a transmission node; and calculating system reliability of the cloud computing network system according to the configurations of the transmission arcs of the first transmission paths satisfying the transmission and distribution traffic and the second transmission paths satisfying the transmission and distribution traffic, wherein the system reliability represents the probability that the total transmission demand is delivered to the cloud servers.

As shown above, the embodiments of the present disclosure may therefore achieve the following effects.

(1) According to the total transmission demand in the system, the topology of each device in the cloud computing network system, and the traffic limit and the corresponding probabilities of the traffic states of the transmission arcs defined in the embodiment of the present disclosure, the probability values corresponding to the reliability of the cloud computing network system can be calculated to provide the manager with a visual management system basis and achieve the effect of the quality and reliability of the dynamic detection system.

(2) The sensitivity analysis provided by the embodiments of the present disclosure can evaluate the impact of each device in the system on the changes in data transmission, thereby improving the quality, so that the entire system can satisfy the information processing needs of enterprises and consumer demand.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION

In view of the above technical problems to be overcome, a system reliability evaluation method is provided in the present disclosure to calculate the reliability of the cloud computing network system 10 in a given network topology.

Figure 1:
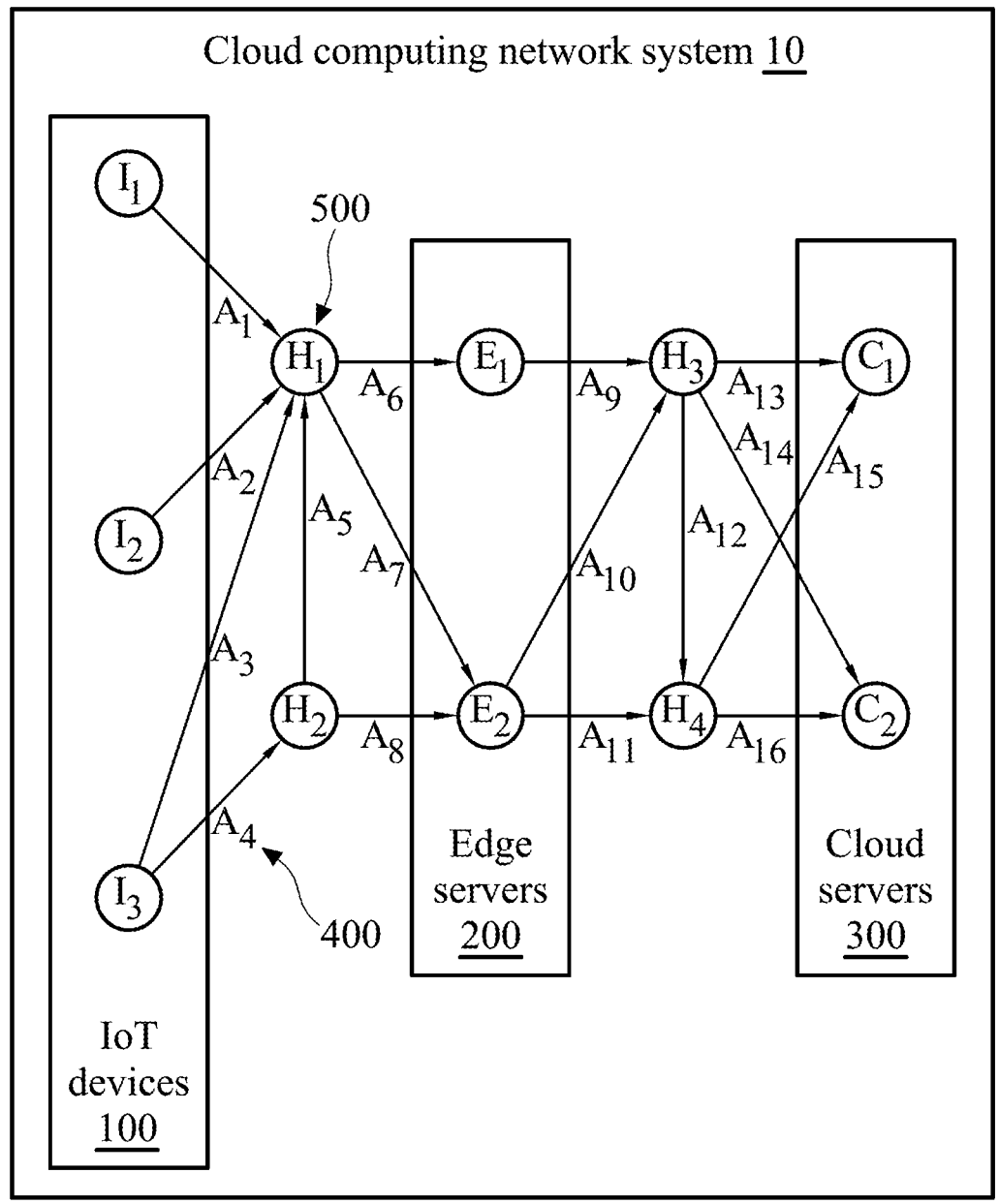
FIG. 1 is a schematic diagram illustrating a topology of devices of the cloud computing network system according to an embodiment of the present disclosure.
Figure 2:
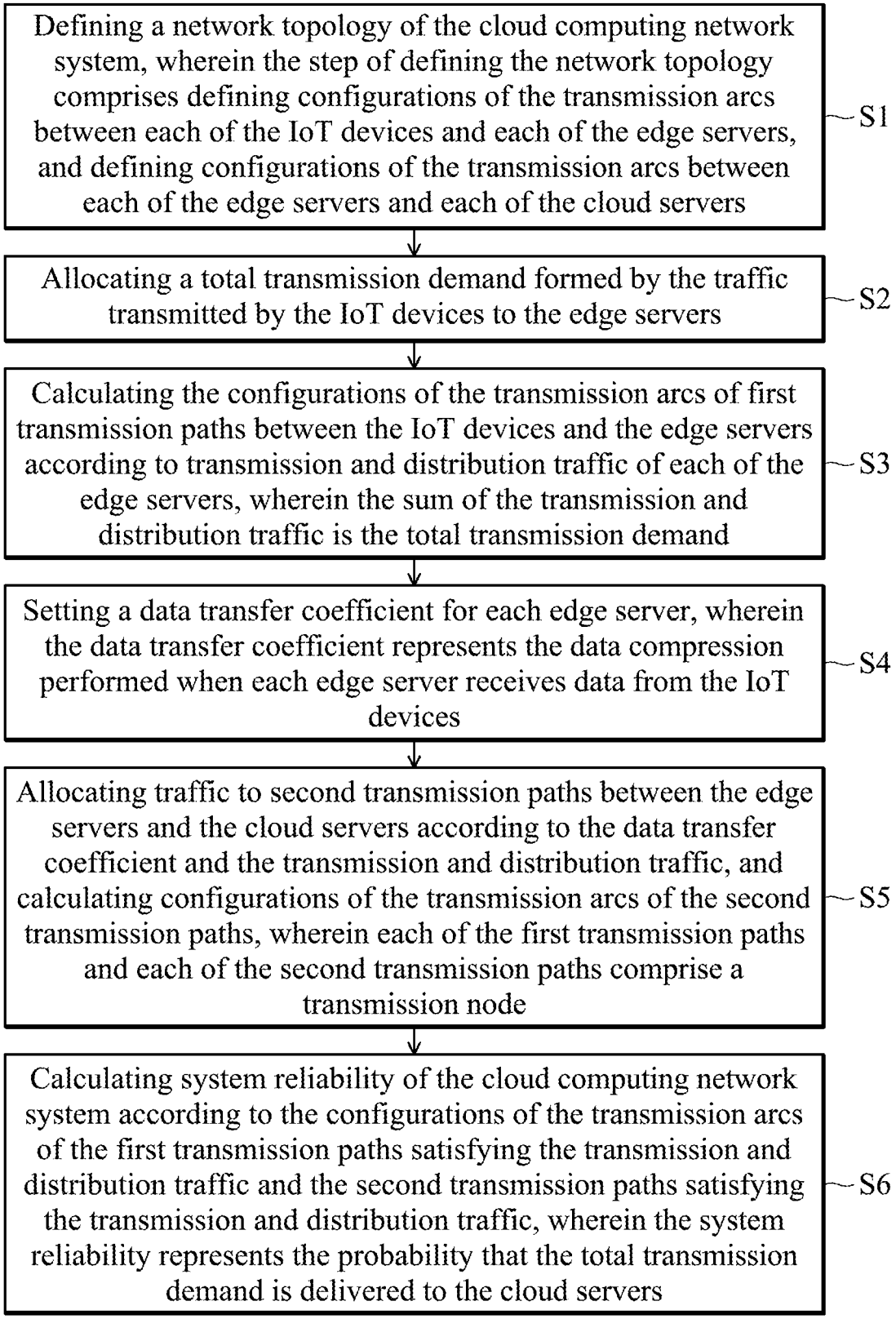
FIG. 2 is a flow diagram illustrating a reliability evaluation method of a cloud computing network system according to an embodiment of the present disclosure.

In order to more clearly describe the embodiments of the present disclosure, please refer to FIGS. 1 and 2, wherein FIG. 1 is a schematic diagram illustrating a topology of devices of the cloud computing network system 10 according to an embodiment of the present disclosure, and FIG. 2 is a flow diagram illustrating a reliability evaluation method of a cloud computing network system according to an embodiment of the present disclosure. As shown in FIG. 2, a system reliability evaluation method provided in the present disclosure is suitable for data transmission of the cloud computing network system 10. The cloud computing network system 10 comprises Internet of Things (IoT) devices 100, edge servers 200, cloud servers 300, and a plurality of transmission arcs 400. The reliability evaluation method of the cloud computing network system 10 comprises the following steps (S1 to S1).

Step S1: defining a network topology of the cloud computing network system 10, wherein the step of defining the network topology comprises defining configurations of the transmission arcs 400 between each of the IoT devices 100 and each of the edge servers 200, and defining configurations of the transmission arcs 400 between each of the edge servers 200 and each of the cloud servers 300. All configurations of the transmission arcs 400 comprise all possible paths for data transmission from the IoT devices 100 to the cloud servers 300 through the edge servers 200.

It should be understood from FIG. 1, the data transmission path of the cloud computing network system 10 is defined as a path through which data is transmitted from the IoT devices 100 through the edge servers 200 to the cloud servers 300. Due to factors such as the overall transmission load, computing load and transmission speed of the system, the data transmitted by the IoT devices 100 may be processed or compressed by the edge servers 200 to reduce the burden on the back-end cloud servers 300.

Therefore, the configuration of each transmission arc 400 between each IoT device 100 and each edge server 200 and the configuration of each transmission arc 400 between each edge server 200 and each cloud server 300 in the cloud computing network system 10, such as the connection relationship, must be defined first when the system reliability of the cloud computing network system 10 is calculated.

The IoT device 100, for example, may be a user's terminal device, such as a mobile phone, a tablet computer, a sensor, a notebook computer, and so on. The transmission arc 400 may be a transmission network line connecting various devices in the cloud computing network system 10, such as an optical fiber network line or a wireless network, and so on.

Step S2: allocating a total transmission demand formed by the traffic transmitted by the IoT devices 100 to the edge servers 200.

The allocation step can be explained by using the IoT devices 100 in FIG. 1. For example, the total demand of 7 Gb per second (7 Gb/s) is allocated in the manner of (2 Gb/s, 2 Gb/s and 3 Gb/s) to the IoT devices 100 (for example, $I_1$, $I_2$, and $I_3$ in FIG. 1). Each of the IoT devices 100 transmits the allocated traffic to the edge server 200 (for example, $E_1$ and $E_2$ in FIG. 1) via the transmission arcs 400 (for example, $A_1$, $A_2$, $A_3$ to $A_8$ in FIG. 1). Therefore, the total amount of data received by the edge servers 200 is also equal to 7 Gb per second (Gb/s).

Step S3: calculating the first transmission paths between the IoT devices 100 and the edge servers 200 and the first transmission probability values corresponding to the first transmission paths according to the total transmission demand and the configurations of the transmission arcs 400.

The first transmission paths are described in detail below.

The first transmission paths can be explained by using the transmission arcs 400 in FIG. 1. For example, $I_1$ of the IoT devices 100 may transmit data to $E_1$ of the edge servers 200 via $\{A_1, A_6\}$ of the transmission arcs 400, or may also transmit data to $E_2$ of the edge servers 200 via $\{A_1, A_7\}$ of the transmission arcs 400. As long as the amount of data transmitted via these two paths is equal to the amount of data allocated to $I_1$ of the IoT devices 100, it represents that $I_1$ of the IoT devices 100 has achieved the action of transmitting the data to the edge servers 200.

Similarly, the corresponding transmission paths of $I_2$ and $I_3$ of the IoT devices 100 can also be obtained, as shown in TABLE 1.

TABLE 1

| $B(I_i, E_e)$ | $P_j$ |
|---|---|
| $B(I_1, E_1)$ | $P_1 = \{A_1, A_6\}$ |
| $B(I_1, E_2)$ | $P_2 = \{A_1, A_7\}$ |
| $B(I_2, E_1)$ | $P_3 = \{A_2, A_6\}$ |
| $B(I_2, E_2)$ | $P_4 = \{A_2, A_7\}$ |
| $B(I_3, E_1)$ | $P_5 = \{A_3, A_6\}$, |
|  | $P_6 = \{A_4, A_5, A_6\}$ |
| $B(I_3, E_2)$ | $P_7 = \{A_3, A_7\}$ |
|  | $P_8 = \{A_4, A_5, A_7\}$, |
|  | $P_9 = \{A_4, A_8,\}$ |

Wherein B represents the combination of the i-th IoT device transmitting data to the e-th edge server, $I_i$ represents the i-th IoT device, $E_e$ represents the e-th edge server, and $P_j$ represents that the i-th IoT device transmits data to the e-th edge server via the j-th path.

Based on the above description and the allocation of the total transmission demand (2 Gb/s, 2 Gb/s, 3 Gb/s), the following equation needs to be satisfied:

$$\sum_j \{f_j \mid P_j \in B(I_1, E)\} = f_1 + f_2 = d_1 = 2 \quad \text{Equation (1)}$$

$$\sum_j \{f_j \mid P_j \in B(I_2, E)\} = f_3 + f_4 = d_2 = 2 \quad \text{Equation (2)}$$

$$\sum_j \{f_j \mid P_j \in B(I_3, E)\} = f_5 + f_6 + f_7 + f_8 + f_9 = d_3 = 3 \quad \text{Equation (3)}$$

Wherein Equations (1) to (3) represent that the demand traffic allocated to each IoT device 100 (i.e., $I_1$, $I_2$ and $I_3$) is transmitted to the edge servers 200 (i.e., $E_1$ and $E_2$) through the transmission arcs 400, and each IoT device 100 may transmit the allocated demand traffic to more than one edge server 200, wherein the paths that satisfy Equations (1) to (3) represent the first transmission paths ($f_1$, $f_2$, $f_3$ to $f_9$).

The first transmission probability values refer to the configurations of the transmission arcs in which each transmission arc 400 transmits traffic to each edge server 200 according to the traffic load that each transmission arc 400 in each first transmission path can provide and the amount of traffic that needs to be transmitted.

Step S4: setting a data transfer coefficient for each edge server 200, wherein the data transfer coefficient represents the data compression performed when each edge server 200 receives data from the IoT devices 100.

The data transfer coefficient means that in order to reduce the overall transmission load, computing load, and transmission speed of the system, each edge server 200 first performs data processing or data compression to reduce the burden on the back-end cloud servers 300 after the edge servers 200 receive the data transmitted by the IoT devices 100.

Step S5: calculating the configurations of the transmission arcs of the second transmission paths between the edge servers 200 and the cloud servers 300 according to the data transmission coefficients and the total transmission demand of the edge servers 200, wherein the first transmission paths and the second transmission paths comprise transmission nodes 500.

The second transmission paths are described in detail below.

Similar to the first transmission paths, the second transmission paths can be explained by using the transmission arcs 400 in FIG. 1. For example, $E_1$ of the edge servers 200 may transmit data via $\{A_9, A_{13}\}$ of the transmission arcs 400 to $C_1$ of the cloud servers 300, or may transmit data via $\{A_9, A_{14}\}$ of the transmission arcs 400 to $C_2$ of the cloud servers 300. As long as the amount of data transmitted via these two paths is equal to the amount of data allocated to $E_1$ of the edge servers 200, it represents that $E_1$ of the edge servers 200 has achieved the action of transmitting the data to the cloud servers 300.

Similarly, the corresponding transmission paths of $E_1$ and $E_2$ of the edge servers 200 can also be obtained, as shown in TABLE 2.

TABLE 2

| $B(E_e, C_c)$ | $P_j$ |
|---|---|
| $B(E_1, C_1)$ | $P_{10} = \{A_9, A_{13}\}$, |
|  | $P_{11} = \{A_9, A_{12}, A_{15}\}$ |
| $B(E_1, C_2)$ | $P_{12} = \{A_9, A_{14}\}$, |
|  | $P_{13} = \{A_9, A_{12}, A_{16}\}$ |
| $B(E_2, C_1)$ | $P_{14} = \{A_{10}, A_{13}\}$, |
|  | $P_{15} = \{A_{10}, A_{12}, A_{15}\}$, |
|  | $P_{16} = \{A_{11}, A_{15}\}$ |
| $B(E_2, C_2)$ | $P_{17} = \{A_{10}, A_{14}\}$, |
|  | $P_{18} = \{A_{10}, A_{12}, A_{16}\}$, |
|  | $P_{19} = \{A_{11}, A_{16}\}$ |

Wherein B represents the combination of the e-th edge server transmitting data to the c-th cloud server, $E_e$ represents the e-th edge server, $C_c$ represents the c-th cloud server, and $P_j$ represents that the e-th edge server transmits data to the c-th cloud server via the j-th path.

Based on the above description, it is assumed that the received traffic allocation of $(E_1, E_2)$ of the edge servers 200 are (4 Gb/s, 3 Gb/s), and the data transfer coefficient p=0.6. The following equation needs to be satisfied:

$$\sum_j \{f_j \mid P_j \in B(E_1, C)\} = f_{10} + f_{11} + f_{12} + f_{13} = d_1' = 2.4 \quad \text{Equation(4)}$$

wherein $d_1' = (f_1 + f_3 + f_5 + f_6) \times 0.6 = 2.4$.

$$\sum_j \{f_j \mid P_j \in B(E_2, C)\} = f_{14} + f_{15} + f_{16} + f_{17} + f_{18} + f_{19} = d_2' = 1.8$$

wherein $d_2' = (f_2 + f_4 + f_7 + f_8 + f_9) \times 0.6 = 1.8$.

Equations (4) to (5) represent that the traffic received by each of the edge servers 200 (i.e., $E_1$ and $E_2$) is transmitted to the cloud servers 300 (i.e., $C_1$ and $C_2$) through the transmission arcs 400, and each edge server 200 may transmit the allocated demand traffic to more than one cloud server 300, wherein the paths that satisfy Equations (4) to (5) represent the second transmission paths ($f_{10}$, $f_{11}$, $f_{12}$ to $f_{19}$).

The transmission nodes 500 (for example, the transmission nodes 500 can be routers) may correspond to $H_1$, $H_2$, $H_3$ and $H_4$ in FIG. 1, and can be used as data relays during the entire data transmission process.

Step S6: calculating the system reliability of the cloud computing network system according to the configurations of the transmission arcs of the first transmission paths satisfying the transmission and distribution traffic and the second transmission paths satisfying the transmission and distribution traffic, wherein the system reliability represents the probability that the total transmission demand is delivered to the cloud servers 300.

As shown above, the first transmission paths and the second transmission paths can be defined as a larger combination, which is defined as $F=(f_1, f_2, f_3, \ldots, f_{19})$, representing that the total transmission demand allocated to the IoT devices 100 may be transmitted to the edge servers 200 through some of $f_1$ to $f_9$ of F (corresponding to the first transmission paths), and the traffic received by the edge servers 200 are transmitted to the cloud server s300 through some of $f_{10}$ to $f_{19}$ of F (corresponding to the second transmission paths).

Figure 3:
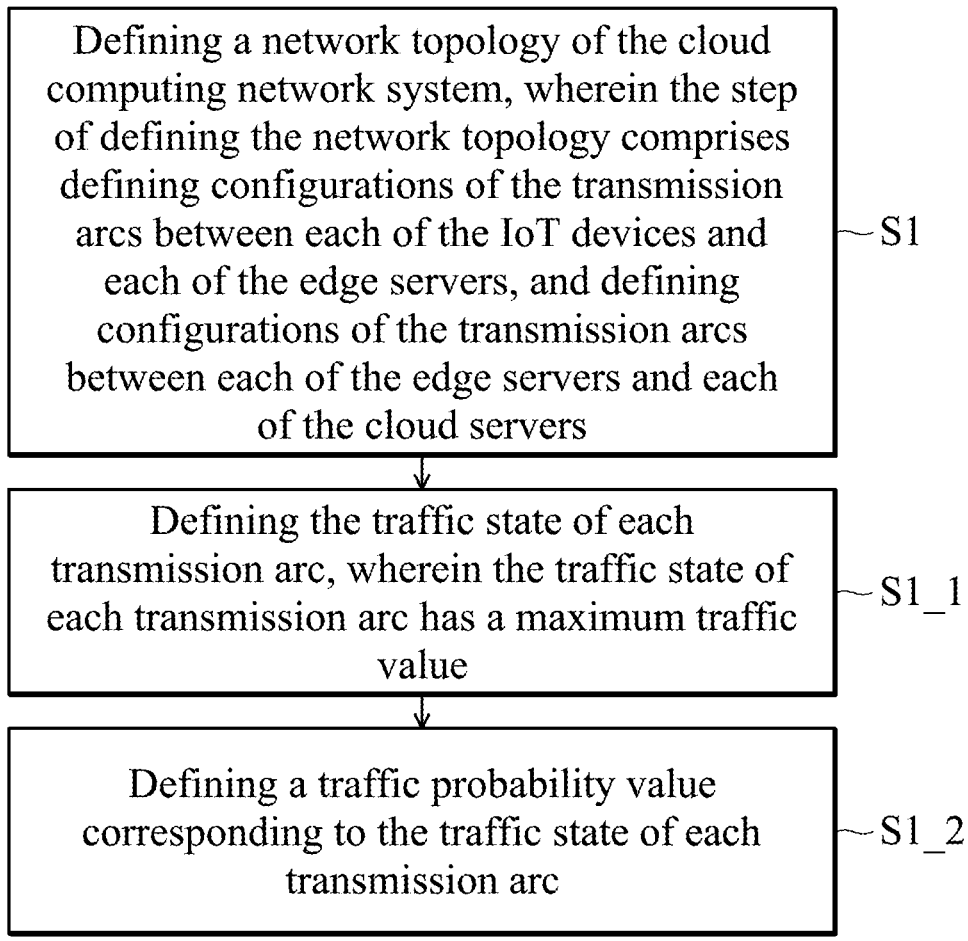
FIG. 3 is a flowchart of defining the transmission arc of the cloud computing network system according to an embodiment of the present disclosure.

Please refer to FIG. 3, FIG. 3 is a flowchart of defining the transmission arc of the cloud computing network system according to an embodiment of the present disclosure.

According to an embodiment of the present disclosure, the step of defining the configurations of the transmission arcs 400 comprises step S1-1: defining the traffic state of each transmission arc, wherein the traffic state of each transmission arc has a maximum traffic value.

According to an embodiment of the present disclosure, the step of defining the configurations of the transmission arcs 400 comprises step S1-2: defining a traffic probability value corresponding to the traffic state of each transmission arc 400.

The transmission arc 400: is described in detail below.

For the configurations of the transmission arcs 400, such as the traffic states and the corresponding traffic probability values, refer to TABLE 3.

TABLE 3

| | Allowable traffic value (unit: Gb/s) | | | | | |
|---|---|---|---|---|---|---|
| | 0 | 1 | 2 | 3 | 4 | 5 |
| | Probability value | | | | | |
| Transmission arc ($A_a$) | Pr ($X_a = 0$) | Pr ($X_a = 1$) | Pr ($X_a = 2$) | Pr ($X_a = 3$) | Pr ($X_a = 4$) | Pr ($X_a = 5$) |
| $A_1$ | 0.01 | 0.01 | 0.03 | 0.05 | 0.02 | 0.88 |
| $A_2$ | 0.02 | 0.03 | 0.05 | 0.02 | 0.88 | 0 |
| $A_3$ | 0.01 | 0.01 | 0.03 | 0.05 | 0.02 | 0.88 |
| $A_4$ | 0.02 | 0.03 | 0.05 | 0.02 | 0.88 | 0 |
| $A_5$ | 0.01 | 0.01 | 0.03 | 0.05 | 0.02 | 0.88 |
| $A_6$ | 0.02 | 0.03 | 0.05 | 0.02 | 0.88 | 0 |
| $A_7$ | 0.01 | 0.01 | 0.03 | 0.05 | 0.02 | 0.88 |
| $A_8$ | 0.02 | 0.03 | 0.05 | 0.02 | 0.88 | 0 |
| $A_9$ | 0.01 | 0.01 | 0.03 | 0.05 | 0.02 | 0.88 |
| $A_{10}$ | 0.02 | 0.03 | 0.05 | 0.02 | 0.88 | 0 |
| $A_{11}$ | 0.01 | 0.01 | 0.03 | 0.05 | 0.02 | 0.88 |
| $A_{12}$ | 0.02 | 0.03 | 0.05 | 0.02 | 0.88 | 0 |
| $A_{13}$ | 0.01 | 0.01 | 0.03 | 0.05 | 0.02 | 0.88 |
| $A_{14}$ | 0.02 | 0.03 | 0.05 | 0.02 | 0.88 | 0 |
| $A_{15}$ | 0.01 | 0.01 | 0.03 | 0.05 | 0.02 | 0.88 |
| $A_{16}$ | 0.02 | 0.03 | 0.05 | 0.02 | 0.88 | 0 |

Aa in TABLE 3 may correspond to $A_1$ to $A_{16}$ in FIG. 1 and represents each transmission arc 400. Pr ($X_a$=0, 1, 2, 3, 4, 5)

corresponding to each transmission arc 400 represents that the transmission arcs 400 have different traffic states and the corresponding traffic probability values. For example, the probability of $A_2$ at a traffic value of 4 Gb/s is 0.88, and 4 Gb/s is the maximum traffic value of $A_2$, so the probability of $A_2$ at a traffic value of 5 Gb/s is 0. The probability value corresponding to each transmission arcs 400 in different traffic states may be obtained after statistics of the historical data of each transmission arc 400.

After the first transmission paths are determined according to TABLE 1, how much traffic each transmission arc 400 needs to transmit can be known. For example, F=(2, 0, 2, 0, 0, 0, 3, 0, 0, 2.4, 0, 0, 0, 1.8, 0, 0, 0, 0) represents that the IoT device $I_1$ transmits data to the edge server $E_1$ via the transmission arcs $A_1$ and $A_6$ at 2 Gb/s, the IoT device $I_2$ transmits data to the edge server $E_1$ via the transmission arcs $A_2$ and $A_6$ at 2 Gb/s, and the IoT device $I_3$ transmits data to the edge server $E_2$ via the transmission arcs $A_3$ and $A_7$ at 3 Gb/s.

Similarly, after the second transmission paths are determined according to TABLE 2, how much traffic each transmission arc 400 needs to transmit can be known. For example, F=(2, 0, 2, 0, 0, 0, 3, 0, 0, 2.4, 0, 0, 0, 1.8, 0, 0, 0, 0) represents that the edge server $E_1$ transmits data to the cloud server $C_1$ via the transmission arcs $A_9$ and $A_{13}$ at 2.4 Gb/s, and the edge server $E_2$ transmits data to the cloud server $C_1$ via the transmission arcs $A_{10}$ and $A_{13}$ at 1.8 Gb/s.

Take the allocation of the total transmission demand distribution (2 Gb/s, 2 Gb/s, 3 Gb/s) as an example and consider the maximum traffic limit of each transmission arc 400 and the data transfer coefficient p=0.6, there can be 315 configurations of ($f_1$, $f_2$, $f_3$ to $f_9$), there can be 60 configurations of ($f_{10}$, $f_{11}$, $f_{12}$ to $f_{19}$), and there can be 29154 configurations of ($f_1$, $f_2$, $f_3$ to fly).

According to an embodiment of the present disclosure, each first transmission probability value is calculated according to each traffic probability value of each transmission arc and the traffic allocated to each IoT device 100, and each second transmission probability value is calculated according to each traffic probability value of each transmission arc, the data transfer coefficients, and the relay traffic received by each edge server 200.

The calculation of the first transmission probability values and the second transmission probability values will be described in detail as follows.

After the first transmission paths and the second transmission paths (that is, F) are determined, the probability of each transmission arc 400 successfully transmitting the amount of data can be calculated according to the combination of F.

Taking F=(2, 0, 2, 0, 0, 0, 3, 0, 0, 2.4, 0, 0, 0, 1.8, 0, 0, 0, 0, 0) as an example, the amount of traffic required by each transmission arc 400 can be calculated to form a corresponding combination X=($x_1$, $x_2$, $x_3$, . . . , $x_{16}$), as shown in TABLE 4.

TABLE 4

| $x_a$ (the traffic burdened by the a-th transmission arc) | Corresponding path $f_{m1+m2}$ |
|---|---|
| $x_1$ | $f_1 + f_2$ |
| $x_2$ | $f_3 + f_4$ |
| $x_3$ | $f_5 + f_7$ |
| $x_4$ | $f_6 + f_8 + f_9$ |

TABLE 4-continued

| $x_a$ (the traffic burdened by the a-th transmission arc) | Corresponding path $f_{m1+m2}$ |
|---|---|
| $x_5$ | $f_6 + f_8$ |
| $x_6$ | $f_1 + f_3 + f_5 + f_6$ |
| $x_7$ | $f_2 + f_4 + f_7 + f_8$ |
| $x_8$ | $f_9$ |
| $x_9$ | $f_{10} + f_{11} + f_{12} + f_{13}$ |
| $x_{10}$ | $f_{14} + f_{15} + f_{17} + f_{18}$ |
| $x_{11}$ | $f_{17} + f_{19}$ |
| $x_{12}$ | $f_{12} + f_{14} + f_{16} + f_{19}$ |
| $x_{13}$ | $f_{11} + f_{15}$ |
| $x_{14}$ | $f_{13} + f_{18}$ |
| $x_{15}$ | $f_{12} + f_{16} + f_{17}$ |
| $x_{16}$ | $f_{13} + f_{18} + f_{19}$ | wherein $x_a$ represents the traffic burdened by the a-th transmission arc, $m_1$ represents the possible number of the first transmission paths, and $m_2$ represents the possible number of the second transmission paths. Since different IoT devices 100 or edge servers 200 may all use the same transmission arc 400 when transmitting data, the correlations between each transmission arc 400 and the first transmission path/the second transmission path are listed in TABLE 4.

As shown above, F=(2, 0, 2, 0, 0, 0, 3, 0, 0, 2.4, 0, 0, 0, 1.8, 0, 0, 0, 0) can be converted into X=(2, 2, 3, 0, 0, 4, 3, 0, 3, 2, 0, 0, 5, 0, 0, 0), which represents the total transmission demand of 7 Gb/s is allocated to the IoT devices ($I_1$, $I_2$, $I_3$) in the form of (2 Gb/s, 2 Gb/s, 3 Gb/s), the IoT devices ($I_1$, $I_2$, $I_3$) respectively transmit the traffic (2 Gb/s, 2 Gb/s, 3 Gb/s, 4 Gb/s, 3 Gb/s) to the edge servers through the transmission arcs ($A_1$, $A_2$, $A_3$, $A_6$, $A_7$), and then the edge servers respectively transmit the traffic (3 Gb/s, 2 Gb/s, 5 Gb/s) to the cloud servers through the transmission arcs ($A_9$, $A_{10}$, $A_{13}$).

Therefore, the first transmission probability values and the second transmission probability values may be accurately calculated according to the traffic states of the transmission arcs and the corresponding traffic probability values. For example, $A_1$ is used to transmit the data traffic at 2 Gb/s. According to TABLE 3, the probability of data successfully transmitted through $A_1$ can be calculated as 0.03+0.05+0.02+0.88=0.98. Similarly, the data traffic is transmitted through $A_{13}$ at 4.2 Gb/s. Therefore, the data traffic can only be successfully transmitted when the allowable traffic state of the transmission arc $A_{13}$ is 5 Gb/s, and the probability of data successfully transmitted through $A_{13}$ is 0.88.

According to an embodiment of the present disclosure, any two adjacent transmission nodes 500 further comprise a transmission arc 400. For example, the transmission nodes $H_1$ and $H_2$ in FIG. 1 comprise a transmission arc $A_5$, and the transmission nodes $H_3$ and $H_4$ comprise a transmission arc $A_{12}$, wherein the transmission node is used as a relay transmission node in the cloud computing network system 10 to further transmit data.

According to an embodiment of the present disclosure, among the first transmission paths and the second transmission paths, all transmission arcs 400 are unidirectional transmission, which means that data may not be transmitted back and forth in the same transmission arc 400 to avoid invalid data transmission during the entire data transmission process.

According to an embodiment of the present disclosure, the data transfer coefficient is between 0 and 1. The data transfer coefficient represents that the edge servers 200 process or compress the received data, so as to reduce the overall transmission burden of the cloud network computing system 10.

According to an embodiment of the present disclosure, when the capacity vectors of all the first transmission paths that satisfies the demand cannot be found, the first transmission probability values corresponding to all the first transmission paths are set to 0. When the first transmission probability values corresponding to all the first transmission paths are 0, the subsequent system reliability evaluation method may be stopped. In other words, when the data cannot be smoothly transmitted from the IoT devices 100 to the edge servers 200, the subsequent calculation of the system reliability may be stopped to reduce unnecessary computational burden.

According to an embodiment of the present disclosure, the system reliability corresponding to the total transmission demand corresponds to the union of the configurations of the transmission arcs of the first transmission paths with the shortest path, and the second transmission paths with the shortest path.

The calculation of the system reliability corresponds to the total transmission demand. For example, taking 7 Gb/s (2 Gb/s, 2 Gb/s, 3 Gb/s) allocated to the IoT devices 100 (i.e., $I_1, I_2, I_3$) as an example, the corresponding combination $F=(f_1, f_2, f_{19})$ (that is, the first transmission paths and the second transmission paths) may be found. Then, F may be converted into the data traffic combination $X=(x_1, x_2, x_3, \ldots, x_{16})$ that must be transmitted by each transmission arcs 400, and the probabilities of the union of all configurations of the minimum transmission arcs are found.

Taking the total demand of 7 Gb/s (2 Gb/s, 2 Gb/s, 3 Gb/s) allocated to the IoT devices 100 as an example, there are 29154 ways to meet the total demand of combination F, and there are 2675 kinds of combinations X that can achieve the conditions of the configurations of the minimum transmission arcs. Therefore, all the X to obtain the probability value corresponding to the system reliability, as shown in the following equation.

$$R_{(2,2,3),D'} = Pr\left\{ \bigcup_{r=1}^{2675} \{X \mid X \geq X^r\} \right\} = 0.9106$$

It is assumed that the two minimum configurations of the transmission arcs are X=(2, 2, 3, 0, 0, 4, 3, 0, 3, 2, 0, 0, 5, 0, 0, 0) and X=(2, 2, 3, 0, 0, 4, 3, 0, 3, 2, 0, 1, 4, 0, 1, 0), which both are the configurations that can successfully transmit data. It should be understood that the overall system reliability may be obtained by calculating the combination F that meets the total demand, and calculating the combination X corresponding to the configurations of the minimum transmission arcs.

According to an embodiment of the present disclosure, the system reliability evaluation method is repeatedly executed under the same conditions of total transmission demand. When the configurations of the IoT devices 100 are different, different sensitivities of the IoT devices 100 may be generated. In other words, the sensitive analysis is used to repeatedly execute the system reliability evaluation method for system improvement or demand allocation.

The sensitivity mentioned above may represent that the total transmission demand is allocated to the IoT devices 100 in different ways when the total transmission demand is the same. For example, the total transmission demand is 7 Gb/s, the data transfer coefficient p=0.6, and the total transmission demand of 7 Gb/s is allocated to the IoT devices 100 (($I_1, I_2, I_3$)=(3, 2, 2), (2, 3, 2) and (2, 2, 3)), the probability values of the corresponding system reliability according to the allocated total transmission demand are 0.877606, 0.857671 and 0.913758, respectively. In this way, the probability values can be compared with the probability value of the system reliability using another total transmission demand (for example, the total transmission demand is 6 Gb/s, the data transfer coefficient p=0.6, and ($I_1, I_2, I_3$)=(2, 2, 2)) to find out the IoT devices 100 in the cloud computing network system 10 that have a greater impact on the changes in data traffic transmission.

Accordingly, the method, device and computer program product according to the present disclosure may simulate all transmission paths of existing network transmission, obtain the transmission success rate of each transmission path and find the bottleneck of network transmission, so as to effectively optimize the transmission structure. While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system reliability evaluation method, suitable for data transmission of a cloud computing network system, wherein the cloud computing network system comprises Internet of Things (IoT) devices, edge servers, cloud servers, and transmission arcs, the system reliability evaluation method comprising:
    defining a network topology of the cloud computing network system, wherein the step of defining the network topology comprises defining configurations of the transmission arcs between the IoT devices and the edge servers, and defining configurations of the transmission arcs between the edge servers and the cloud servers;
    allocating a total transmission demand formed by the traffic transmitted by the IoT devices to the edge servers;
    calculating the configurations of the transmission arcs of first transmission paths between the IoT devices and the edge servers according to transmission and distribution traffic of each of the edge servers, wherein the sum of the transmission and distribution traffic is the total transmission demand;
    setting a data transfer coefficient for each edge server, wherein the data transfer coefficient represents the data compression performed when each edge server receives data transmitted from the IoT devices;
    allocating traffic to second transmission paths between the edge servers and the cloud servers according to the data transfer coefficient and the transmission and distribution traffic, and calculating configurations of the transmission arcs of the second transmission paths, wherein each of the first transmission paths and each of the second transmission paths comprise a transmission node; and
    calculating system reliability of the cloud computing network system according to the configurations of the transmission arcs of the first transmission paths satisfying the transmission and distribution traffic and the second transmission paths satisfying the transmission and distribution traffic, wherein the system reliability represents the probability that the total transmission demand is delivered to the cloud servers.

2. The system reliability evaluation method as claimed in claim 1, wherein the step of defining the configurations of the transmission arcs comprises:
defining a traffic state of each transmission arc, wherein the traffic state of each transmission arc has a maximum traffic value.

3. The system reliability evaluation method as claimed in claim 2, wherein the step of defining the traffic state of each transmission arc comprises defining a traffic probability value corresponding to the traffic state of each transmission arc.

4. The system reliability evaluation method as claimed in claim 3, wherein each first transmission probability value is calculated according to each traffic probability value of each transmission arc and the traffic allocated to each IoT device, and each second transmission probability value is calculated according to each traffic probability value of each transmission arc, the data transfer coefficients, and the relay traffic received by each edge server.

5. The system reliability evaluation method as claimed in claim 1, wherein the transmission arc is further comprised between the transmissions nodes.

6. The system reliability evaluation method as claimed in claim 1, wherein among the first transmission paths and the second transmission paths, all transmission arcs are unidirectional transmission.

7. The system reliability evaluation method as claimed in claim 1, wherein the data transfer coefficient is between 0 and 1.

8. The system reliability evaluation method as claimed in claim 4, wherein when the first transmission probability values corresponding to all the first transmission paths are 0, the subsequent system reliability evaluation method is stopped.

9. The system reliability evaluation method as claimed in claim 1, wherein the system reliability corresponding to the total transmission demand corresponds to the union of the configurations of the transmission arcs of the first transmission paths with the shortest path, and the second transmission paths with the shortest path.

10. The system reliability evaluation method as claimed in claim 1, further comprising:
the system reliability evaluation method is repeatedly executed under the same conditions of total transmission demand, wherein when the configurations of the IoT devices are different, different sensitivities of the IoT devices are generated.

11. A computer program product for use with a computer, the computer program product comprising a non-transitory computer usable medium having a computer readable program code embodied therein, the computer readable program code performing the steps of:
defining a network topology of the cloud computing network system, wherein the step of defining the network topology comprises defining configurations of the transmission arcs between the IoT devices and the edge servers, and defining configurations of the transmission arcs between the edge servers and the cloud servers;
allocating a total transmission demand formed by the traffic transmitted by the IoT devices to the edge servers;
calculating the configurations of the transmission arcs of first transmission paths between the IoT devices and the edge servers according to transmission and distribution traffic of each of the edge servers, wherein the sum of the transmission and distribution traffic is the total transmission demand;
setting a data transfer coefficient for each edge server, wherein the data transfer coefficient represents the data compression performed when each edge server receives data transmitted from the IoT devices;
allocating traffic to second transmission paths between the edge servers and the cloud servers according to the data transfer coefficient and the transmission and distribution traffic, and calculating configurations of the transmission arcs of the second transmission paths, wherein each of the first transmission paths and each of the second transmission paths comprise a transmission node; and
calculating system reliability of the cloud computing network system according to the configurations of the transmission arcs of the first transmission paths satisfying the transmission and distribution traffic and the second transmission paths satisfying the transmission and distribution traffic, wherein the system reliability represents the probability that the total transmission demand is delivered to the cloud servers.

12. A system reliability evaluation device, suitable for data transmission of a cloud computing network system, wherein the cloud computing network system comprises Internet of Things (IoT) devices, edge servers, cloud servers, and transmission arcs, the system reliability evaluation device comprising:
a processor, configured to execute the following tasks:
defining a network topology of the cloud computing network system, wherein the step of defining the network topology comprises defining configurations of the transmission arcs between the IoT devices and the edge servers, and defining configurations of the transmission arcs between the edge servers and the cloud servers;
allocating a total transmission demand formed by the traffic transmitted by the IoT devices to the edge servers;
calculating the configurations of the transmission arcs of first transmission paths between the IoT devices and the edge servers according to transmission and distribution traffic of each of the edge servers, wherein the sum of the transmission and distribution traffic is the total transmission demand;
setting a data transfer coefficient for each edge server, wherein the data transfer coefficient represents the data compression performed when each edge server receives data transmitted from the IoT devices;
allocating traffic to second transmission paths between the edge servers and the cloud servers according to the data transfer coefficient and the transmission and distribution traffic, and calculating configurations of the transmission arcs of the second transmission paths, wherein each of the first transmission paths and each of the second transmission paths comprise a transmission node; and
calculating system reliability of the cloud computing network system according to the configurations of the transmission arcs of the first transmission paths satisfying the transmission and distribution traffic and the second transmission paths satisfying the transmission and distribution traffic, wherein the system reliability represents the probability that the total transmission demand is delivered to the cloud servers.

13. The system reliability evaluation device as claimed in claim 11, wherein the step of defining the configurations of the transmission arcs executed by the processor comprises:
defining a traffic state of each transmission arc, wherein the traffic state of each transmission arc has a maximum traffic value.

14. The system reliability evaluation device as claimed in claim 13, wherein the step of defining the traffic state of each transmission arc executed by the processor comprises defining a traffic probability value corresponding to the traffic state of each transmission arc.

15. The system reliability evaluation device as claimed in claim 14, wherein each first transmission probability value is calculated according to each traffic probability value of each transmission arc and the traffic allocated to each IoT device, and each second transmission probability value is calculated according to each traffic probability value of each transmission arc, the data transfer coefficients, and the relay traffic received by each edge server.

16. The system reliability evaluation device as claimed in claim 12, wherein the transmission arc is further comprised between the transmissions nodes.

17. The system reliability evaluation device as claimed in claim 12, wherein among the first transmission paths and the second transmission paths, all transmission arcs are unidirectional transmission.

18. The system reliability evaluation device as claimed in claim 12, wherein the data transfer coefficient is between 0 and 1.

19. The system reliability evaluation device as claimed in claim 15, wherein when the first transmission probability values corresponding to all the first transmission paths are 0, the subsequent system reliability evaluation device is stopped.

20. The system reliability evaluation device as claimed in claim 12, wherein the system reliability corresponding to the total transmission demand corresponds to the union of the configurations of the transmission arcs of the first transmission paths with the shortest path, and the second transmission paths with the shortest path.

* * * * *